Nov. 23, 1954

E. S. BROWN 2,694,891

GRASS AND CORN SILAGE HARVESTER

Filed June 27, 1950

Edward S. Brown
INVENTOR.

BY
*Clarence A. O'Brien*
*and Harvey B. Jacobson*
Attorneys

Nov. 23, 1954

E. S. BROWN 2,694,891

GRASS AND CORN SILAGE HARVESTER

Filed June 27, 1950

Edward S. Brown
INVENTOR.

Nov. 23, 1954

E. S. BROWN 2,694,891

GRASS AND CORN SILAGE HARVESTER

Filed June 27, 1950

Edward S. Brown
INVENTOR.

United States Patent Office 2,694,891
Patented Nov. 23, 1954

2,694,891

GRASS AND CORN SILAGE HARVESTER

Edward S. Brown, Marion Center, Pa.

Application June 27, 1950, Serial No. 170,543

3 Claims. (Cl. 56—10)

This invention comprises novel and useful improvements in a grass and corn silage harvester, and more specifically pertains to a harvesting device specifically adapted for the sequential operations of mowing or harvesting, elevating the crop that is cut, conveying the elevated material into a comminuting device, and forcibly blowing the macerated material through a discharge spout to a receptacle of any desired sort.

The principal object of this invention is to provide an apparatus which shall be capable of the heretofore separately performed operations of cutting or mowing grass or corn, gathering the same, shredding or comminuting the material harvested in preparation for forming silage therefrom, and finally discharging the comminuted material at various desired locations.

A further object of the invention is to provide an improved silage harvester wherein a sickle knife constituting a moving device shall be associated with an elevating device in such way that the same shall be capable of simultaneous actuation and simultaneous vertical pivoting movement.

A further object of the invention is to provide an improved harvester having a discharge spout which may be adjustable both horizontally and vertically to position the discharge end of the same at any desired location.

A still further object of the invention is to provide an improved assembly of the various elements of a silage harvester as set forth hereinbefore, together with improved operating means for connecting the same to a common source of power. These, together with various ancillary features and objects of the invention, which will later become apparent as the following description proceeds, are attained by the present invention, a preferred embodiment of which has been illustrated, by way of example only, in the accompanying drawings, wherein:

Figure 5 is a vertical transverse detail view taken substantially upon the plane indicated by the section line 5—5 of Figure 2, the same being taken in elevation; and Figure 6 is a fragmentary elevational view of a portion of the adjusting mechanism for the discharge spout.

Referring now more specifically to the accompanying drawings, wherein like numerals designate similar parts throughout the various views, the numeral 10 designates generally a harvester frame, the same having a power plant 12 which may be of any desired character, such as an internal combustion engine or the like, and which is connected operatively to the various elements forming the improved harvester for operation of the same as set forth hereinafter.

Figure 1:
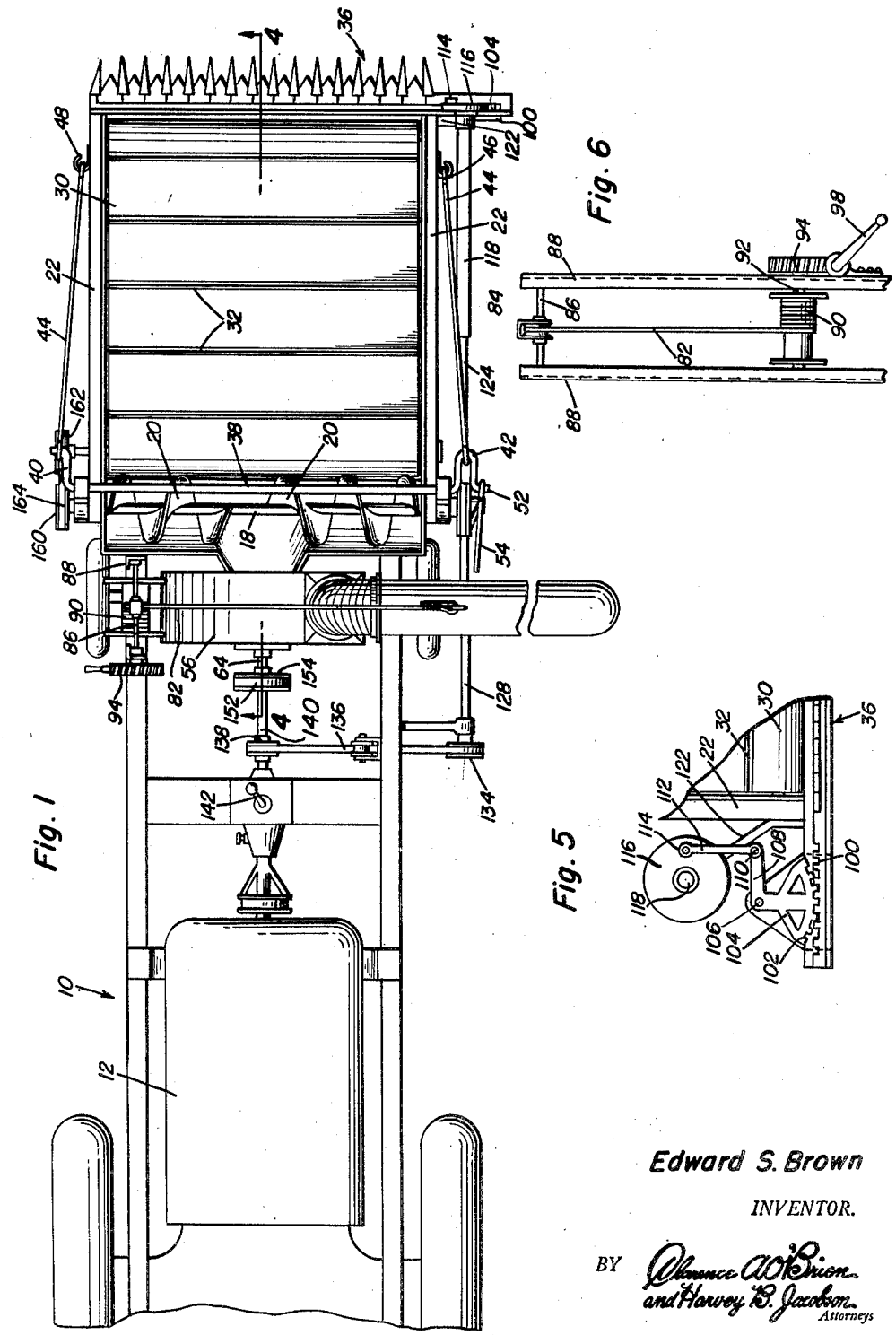
Figure 1 is a top plan view showing a suitable apparatus constructed in accordance with the principles of this invention.

At its front extremity, the supporting frame 10 is provided with a pair of vertical standards 14 which extend both above and below the frame, and rotatably journaled upon the rear side of these standards 14, as by journal bearings 16, is a conveyor shaft 18. The latter, as will be readily apparent from Figure 1, is provided with a pair of oppositely inclined helical conveyor blades 20, whose pitch is such as to cause material delivered to the conveyor to be fed from both ends of the same towards the center for a purpose which will be later set forth.

Rotatably journaled upon the conveyor shaft 18, at their upper ends, are a pair of frame members 22, constituting a support frame having a pair of axles 24 and 26 rotatably journaled between the upper and lower ends of the same. These axles are provided with driving drums or rollers 28 and entrained over these rollers is an endless belt 30 of any desired character, such as canvas or the like, provided with transversely disposed cleats 32, which thus constitute a conventional form of elevating conveyor.

At their lower ends, the frame members 22 are provided with suitable forwardly extending mounting brackets 34, and upon these mounting brackets is affixed a sickle knife cutter bar assembly indicated generally by the numeral 36 and being of a well known and conventional design.

Extending between the upper ends of the standards or supports 14 is a crank shaft 38 having crank arms 40 and 42 upon opposite sides of the standards, and a pair of connecting rods 44 are journaled upon the crank throw arms 40 and 42 and at their lower ends are provided with eyes 46 which are pivotally connected to lifting hooks 48 rigidly secured to the exterior surfaces of the support frame members 22. The crank shaft 38 is provided with an operating lever or crank arm 50, preferably disposed perpendicularly to the crank throw 42, this arm being pivotally connected as at 52 to one end of an operating link 54 which may be connected to any desired control (not shown) for operating the link and thereby oscillating the crank shaft to effect a vertically pivoting raising or lowering movement of the support carrying the endless elevator and the cutter bar assembly.

Suitably mounted upon the supporting framework 10 of the harvester is a combined comminuting device and blower, of any suitable construction, the casing or housing of the same being indicated at 56. This casing, at its forward and lower portion, is provided with an inlet opening 58, see, in particular, Figure 4, from which extends an upwardly inclined dish-shaped trough or chute 60. This trough intersects the mid-portion of a semi-cylindrical, transversely disposed trough 62, see Figures 1 and 3, in which is rotatably received the conveyor shaft 18 and the conveyor helical screws 20. The semi-cylindrical trough 62 is open at its mid-portion to merge with the upper end of the chute 60, whereby material delivered by the upwardly traveling elevator will be discharged into the conveyor screw throughout the length of the same, or will be fed simultaneously from both ends of this conveyor screw into the mid-portion and discharged into the chute 60, from whence the material is delivered into the bottom portion of the comminuting device 56.

The comminuting device and blower is provided with an operating shaft 64 which extends through one side of the device, and the device at its upper end is provided with a discharge conduit 66.

A discharge spout 68, having a nozzle or discharge terminus 70, is provided, the same being connected as by a flexible, yieldable elbow 72 which is horizontally swingably connected to the conduit 66, as by a conventional form of retaining gland 74, while a similar connection may be provided at 76 with the extremity of the discharge spout 68. The spout may be vertically adjusted by means of a rigid hook 78 secured thereto, this hook being engaged by the eye portion 80 of a cable 82 for operating the same. The cable is entrained over an idler pulley 84, this pulley being carried by an axle 86 journaled between the upper extremities of a pair of vertical standards 88 which are fixedly secured to the supporting frame 10 at one side thereof. By means of a drum 90 fixedly secured to an axle 92 journaled between the lower portions of the standards 88, the cable may be selectively reeled in or payed out under the control of a pinion 94 on the end of the axle 92, and a suitable worm gear, not shown, but journaled in a mounting or bearing bracket 96 secured to the standard 88 and having an operating handle or crank 98. As will be readily understood, the worm and pinion drive is irreversible, so that the discharge spout 68 will remain in the adjusted position.

Referring now more specifically to Figure 5, a suitable operating means for the sickle knife construction is disclosed, the same including a rack bar or rack teeth 100 formed on the movable bar of the sickle knife, which teeth are engaged by corresponding teeth 102 carried by a sector plate or rack gear 104 which is journaled upon a pivot pin 106, this gear plate having a crank arm 108 which is pivotally connected, as at 110, to a connecting rod 112 journaled, as at 114, to a disk 116 carried by an actuating shaft 118.

The shaft 118 is journaled as at 120 on a vertical standard 122 rising from one of the support frame members 22 and from the support bracket 34 for the sickle knife construction.

Figure 2:
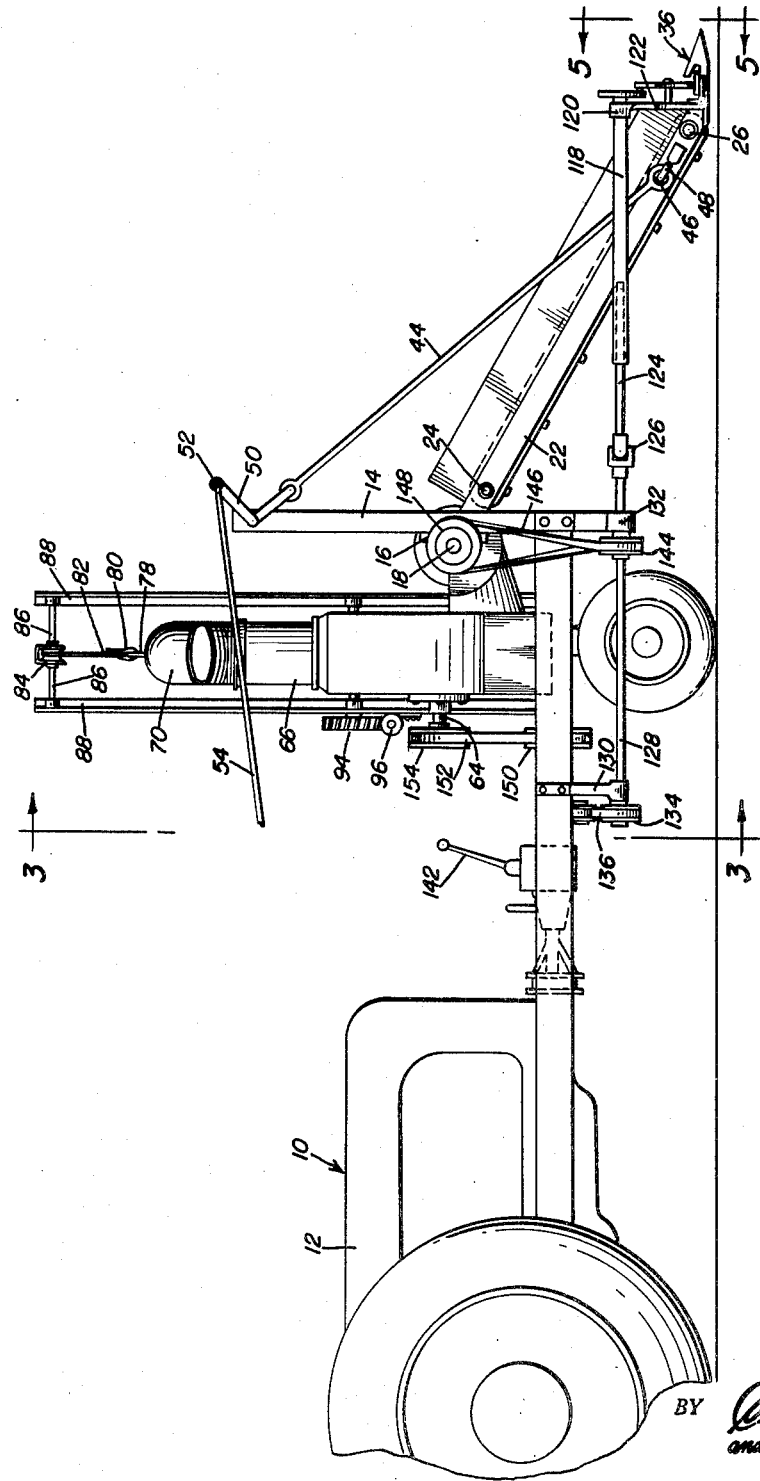
Figure 2 is a side elevational view of the apparatus shown in Figure 1.

As will be more readily apparent from Figure 2, the shaft 118 may conveniently be of a tubular construction and telescopingly receives, in an axially slidable but non-rotatable relation, the shaft section 124, the latter being connected, as by a universal coupling 126, to a lay shaft 128 journaled in depending bearings 130 and in a bearing 132 carried by the depending extremity of one of the standards 14.

At its outer extremity, the lay shaft 128 is provided with a pulley or the like 134 which is connected, as by a belt 136, with a similar pulley 138 on the drive shaft 140, the latter being connected with the power plant 12 through the agency of a clutch assembly, the control member of which is indicated at 142. Adjacent the supporting bearing 132, the shaft 128 is provided with a further pulley 144 which is connected, as by a belt 146 with a corresponding pulley 148 carried by the extremity of the conveyor shaft 18 for operating the latter. The power shaft 140 is in turn provided with a driving pulley 150 which is connected by a belt 152 with a pulley 154 carried on the extremity of the comminuter shaft 64.

Figure 3:
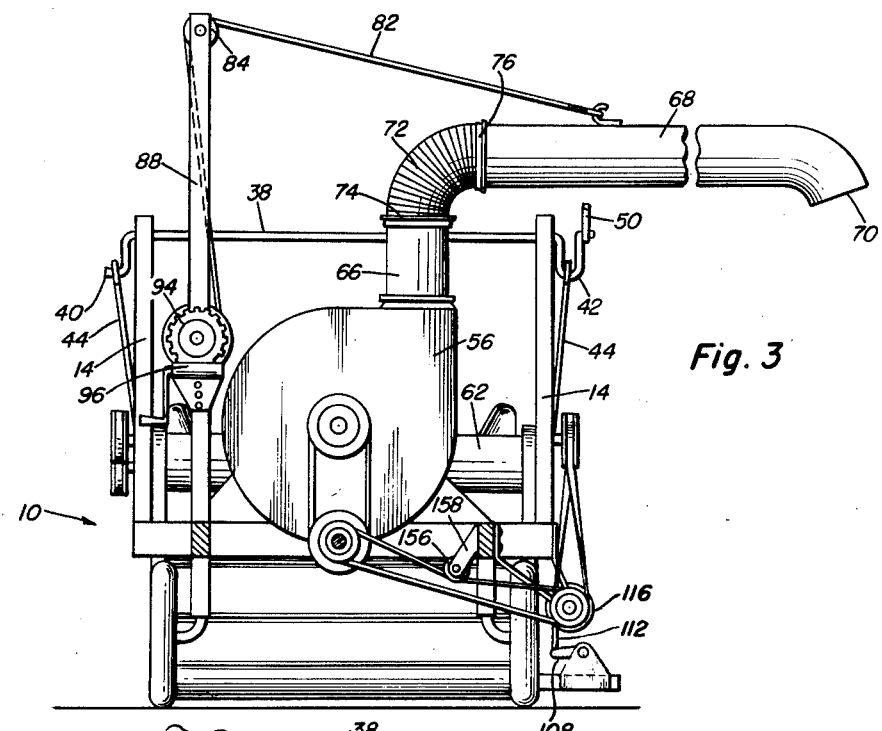
Figure 3 is a vertical transverse sectional view taken substantially upon the plane indicated by the section line 3—3 of Figure 2.
Figure 4:
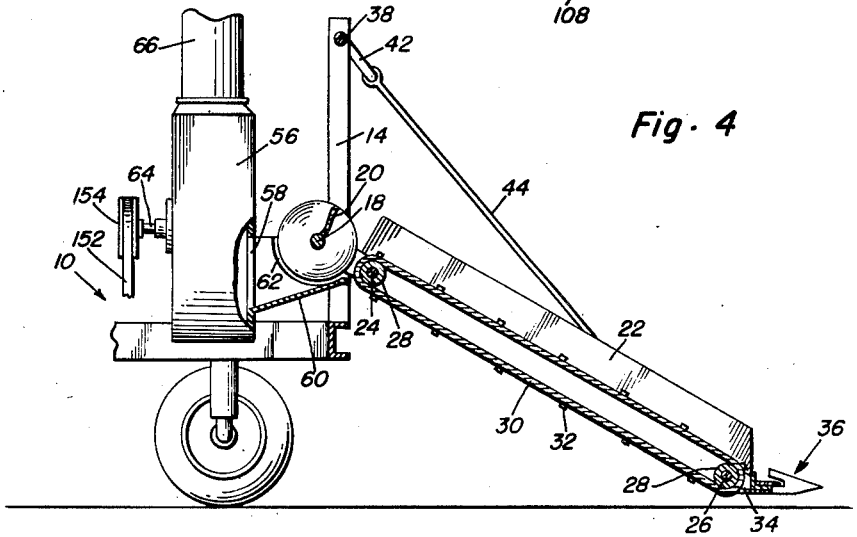
Figure 4 is a vertical longitudinal sectional view taken substantially upon the plane indicated by the section line 4—4 of Figure 1.

Suitable idler pulleys (not shown), such as the idler pulley 156 mounted on a bracket 158, and engaging the belt 136, see Figure 3, may be provided wherever desired.

From the foregoing, it is thought that the construction and its operation will now be readily understood. As the harvester is moved forwardly, power is supplied from the power plant 12, through the clutch controlled by the member 142 to a power shaft 140, and from there separately drives the lay shaft 128 and the combined comminuter and blower shaft 64. From the lay shaft, power is supplied by the belt 146 to the conveyor screw, and by way of the universal joint 126, telescoping shaft sections 124 and 118, and by the rack 100 and rack gear 104 to the cutter bar assembly.

As shown more clearly in Figure 1, power is supplied to the elevator axle 24 from the conveyor shaft 18 by means of pulleys 160, 162 and a connecting belt 164.

It will now be apparent that upon operation of the link 54, the crank shaft 38 may be rocked, and, through the connecting rods 44, cause the above-mentioned vertical pivoting movement of the conveyor, its support frame, the sickle bar carried thereby, without interrupting the operation of their driving mechanism.

Since, from the foregoing, the construction and advantages of this grass and corn silage harvester are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. In a harvester having a comminuting device at the forward end thereof, a trough mounted transversely at the forward end of the harvester and having a central opening therein communicating with the comminuting device, a pair of spaced parallel frame members swingably secured to the harvester at opposite sides of said trough and extending forwardly of said trough, said frame members having free ends terminating remote from said trough, a cutter bar assembly secured to the free ends of said frame members and extending therebetween, an elevator mounted within said frame members and being disposed between said cutter bar assembly and said trough for elevating material cut by the cutter bar assembly to the trough, said elevator, trough and cutter bar assembly being of substantially the same width, an auger in said trough for guiding material from elevator to the trough central opening, reciprocating teeth on said cutter bar assembly and common driving means for simultaneously reciprocating the cutter bar teeth and actuating the auger, said driving means including an extensible section connected to said cutter bar assembly whereby continuous drive for the assembly is maintained as the frame members are swung.

2. In a harvester having a comminuting device at the forward end thereof, a trough mounted transversely at the forward end of the harvester and having a central opening therein communicating with said comminuting device, a pair of spaced parallel frame members swingably secured at their rearward ends to the harvester at opposite sides of the trough, a reciprocating cutter bar assembly mounted at the forward ends of said frame members and extending therebetween, an elevator mounted within said frame members and being disposed between said cutter bar assembly and said trough for elevating material cut by the cutter bar assembly to the trough, an auger in said trough for guiding material from the elevator to the trough central opening, means on said harvester for swinging said frame members, and drive means continuously rotating said auger and reciprocating said cutter bar assembly during swinging movement of said frame members, said driving means including a freely telescoping actuating shaft operatively connected to said cutter bar assembly and extending rearwardly beneath tthe rear ends of said frame members.

3. The combination of claim 2 including a lay shaft suspended beneath said harvester for driving said actuating shaft from a power take-off, said lay and actuating shafts being connected by a universal joint, and pulley means driving said auger from said lay shaft.

References Cited in the file of this patent

UNITED STATES PATENTS

| Number | Name | Date |
|---|---|---|
| 1,457,828 | Erb | June 5, 1923 |
| 2,155,671 | MacGregor | Apr. 25, 1939 |
| 2,269,828 | Michel et al. | Jan. 13, 1942 |
| 2,312,838 | Johnston | Mar. 2, 1943 |
| 2,470,704 | Korsmo et al. | May 17, 1949 |
| 2,447,794 | Gehl | Aug. 2, 1949 |
| 2,494,388 | Heth | Jan. 10, 1950 |
| 2,513,111 | Schiller | June 27, 1950 |
| 2,554,195 | Jones | May 22, 1951 |